United States Patent [19]

Rogers

[11] Patent Number: 4,918,156
[45] Date of Patent: Apr. 17, 1990

[54] POLYESTER RESIN HAVING IMPROVED PROCESSABILITY

[75] Inventor: John H. Rogers, Greenville, S.C.

[73] Assignee: Hoechst Celanese Corporation, Somerville, N.J.

[21] Appl. No.: 68,484

[22] Filed: Jun. 30, 1987

[51] Int. Cl.$^4$ ............................................. C08G 63/02
[52] U.S. Cl. .................................. 528/272; 528/308.2; 525/437; 264/176.1
[58] Field of Search ............................ 528/272, 308.2; 264/176.1; 525/437

[56] References Cited

U.S. PATENT DOCUMENTS

| | | | |
|---|---|---|---|
| 2,823,421 | 2/1958 | Scarlett | 18/57 |
| 3,023,192 | 2/1962 | Shivers, Jr. | 260/75 |
| 3,050,533 | 8/1962 | Munro et al. | 260/346.1 |
| 3,261,812 | 7/1966 | Bell et al. | 260/75 |
| 3,432,591 | 3/1969 | Heffelfinger | 264/289 |
| 3,476,627 | 11/1969 | Squires | 156/244 |
| 3,651,014 | 3/1972 | Witsiepe | 260/75 R |
| 3,669,931 | 6/1972 | Annis et al. | 260/75 R |
| 3,821,156 | 6/1974 | Farrar | 260/40 R |
| 3,833,704 | 9/1974 | Nissel | 264/171 |
| 3,884,870 | 5/1975 | Dodson et al. | 260/40 R |
| 3,907,926 | 9/1975 | Brown et al. | 525/444 |
| 4,003,882 | 1/1977 | Fagerburg et al. | 260/75 R |
| 4,221,703 | 9/1980 | Hoeschele | 260/45.9 |
| 4,349,469 | 9/1982 | Davis et al. | 528/296 |
| 4,443,397 | 4/1984 | Hahn et al. | 264/171 |
| 4,604,446 | 8/1986 | Sand et al. | 528/173 |
| 4,636,442 | 1/1987 | Beavers et al. | 428/480 |

OTHER PUBLICATIONS

"Tenative Data Developmental PCCE Flexible Copolyester," Eastman Chemical Products, Inc. brochure (undated).
"Flex-Crack Resistant Film Compositions," Eastman Chemical Prodcuts, Inc. marketing presentation(11/12/85).
"Method for Tear Propagation Resistance of Plastic Film and Thin Sheeting by A Single Tear Method" Test.

Primary Examiner—John Kight, III
Assistant Examiner—Sam A. Acquah
Attorney, Agent, or Firm—Gregory N. Clements

[57] ABSTRACT

A polyester resin is disclosed which is resistant to splitting during transverse orientation during conventional film manufacturing. The polyester resin contains up to 7 weight percent, based uon the total weight of the resin, of (A) a dicarboxylic acid component consisting essentially of 1,4-cyclohexandeicarboxylic acid having a trans isomer content of at least 70%,
(B) a glycol component consisting essentially of
  (1) 1,4-cyclohexanedimethanol, and
  (2) from about 15 to about 50 weight percent, based on the weight of the polyesterether, of polytetramethyleneether glycol having a molecular weight of about 500 to about 1100 and
(c) from about 0.1 to about 1.5 mole percent, based on the mole percentage of the acid or glycol component, of a branching agent having at least three COOH or OH functional groups and from 3 to 60 carbon atoms.

19 Claims, No Drawings

POLYESTER RESIN HAVING IMPROVED PROCESSABILITY

BACKGROUND OF THE INVENTION

The present invention relates to a polyester resin which exhibits improved processability during manufacture into biaxially-oriented polyester film. More particularly, the present invention relates to a polyester resin which contains a copolyesterether which is based upon 1,4-cyclohexanedimethanol.

Polyester resin is typically manufactured into film by extruding melted polyester resin through a slot die onto a casting drum, thereby rapidly cooling the polyester to form an amorphous (non-crystalline) sheet. The polyester sheet is then biaxially oriented at elevated temperature This is typically accomplished by first stretching the polyester sheet in the longitudinal direction to form monoaxially-oriented polyester film, and then stretching the polyester film in the transverse direction The biaxially-oriented film is then thermally treated under dimensional restraint ("heat-set") to crystallize the film. The process summarized above is described in U.S. Pat. No. 2,823,421.

One problem which can seriously affect the profitable production of polyester film is the frequent and random occurrence of film splits during transverse direction stretching of the film. The frequency of such splitting can depend on a variety of factors including (1) the chemical composition of the film, (2) low melt viscosity (i.e. low average molecular weight), (3) the thickness of the film and (4) the processing conditions, such as temperature, stretching ratios, and stretching rate.

One solution to the problem of excessive film splitting is to increase the average molecular weight of the polyester resin, which is typically reported as its intrinsic viscosity. For example, increasing the intrinsic viscosity of the polyester resin from 0.65 to 0.85 deciliters/gram will substantially reduce film splitting. However, increasing the average molecular weight of the resin is expensive and can result in other processing difficulties. For example, higher molecular weight resins typically require undesirable higher extruder pressures.

The copolyesterethers which form part of the present invention are known per se. U.S. patent No. 4,349,469 discloses elastomeric copolyesterethers based upon poly(1,4-cyclohexanedimethylene-1,4-cyclohexane dicarboxylate) which has been modified with polytetramethyleneether glycol. The copolyesterethers so produced exhibit good melt strength and may be extrusion blown to make clear plastic bags or film. More recently, U.S. Pat. No. 4,636,442 disclosed the coextrusion of the same copolyesterether with a layer of polyethylene terephthalate to produce biaxially-oriented film having superior resistance to flex cracking. U.S. Pat. No. 4,604,446 discloses a sulfonated copolyesterether which is suitable for bonding polyester to poly(vinyl alcohol) or copolymers thereof, especialy with respect to multilayer, biaxially-oriented beverage bottles.

Other patents which disclose copolyesterethers prepared from 1,4-cyclohexanedicarboxylic acid, 1,4-cyclohexanedimethanol and polytetramethyleneether include U.S. Pat. Nos. 4,003,882; 3,261,812; 3,023,192; 4,221,703; and 3,651,014. U.S. Pat. No. 3,733,909 discloses a PET/copolyesterether copolymer and U.S. Pat. No. 3,907,926 discloses blends of polybutylene terephthalate and copolyesterethers.

SUMMARY OF THE INVENTION

In one aspect, the present invention relates to a polyester resin containing a copolyesterether comprising
  (A) a dicarboxylic acid component consisting essentially of 1,4-cyclohexanedicarboxylic acid having a trans isomer content of at least 70%, and
  (B) a glycol component consisting essentially of
    (1) 1,4-cyclohexanedimethanol, and
    (2) from about 15 to about 50 weight percent, based on the weight of the polyesterether, of polytetramethyleneether glycol having a molecular weight of about 500 to about 1100,
  (C) from about 0.1 to about 1.5 mole %, based on the mole of the acid or glycol component, of a branching agent having at least three COOH or OH functional groups and from 3 to 60 carbon atoms,
said copolyesterether being present in said polyester resin in an amount effective to reduce the occurrence of film splitting during the production of biaxially oriented film from said resin but not exceeding 7 weight percent, based upon the total weight of the polyester resin and the copolyesterether.

In another aspect, the present invention relates to an improved process for the manufacture of biaxially-oriented polyester film comprising
  (i) extruding a polyester resin through a slot die and cooling the extruded resin to form an amorphous polyester sheet;
  (ii) biaxially orienting said polyester sheet to form a polyester film;
  (iii) heat setting said polyester film with the proviso that said polyester resin contains
  (A) a dicarboxylic acid component consisting essentially of 1,4-cyclohexanedicarboxylic acid having a trans isomer content of at least 70%,
  (B) a glycol component consisting essentially of
    (1) 1,4-cyclohexanedimethanol,
    (2) from about 15 to about 50 weight percent, based on the weight of the polyesterether, of polytetramethyleneether glycol having a molecular weight of about 500 to about 1100,
  (C) from about 0.1 to about 1.5 mole %, based on the mole % of the acid or glycol component, of a branching agent having at least three COOH or OH functional groups and from 3 to 60 carbon atoms,
said copolyesterether being present in said polyester resin in an amount effective to reduce the occurrence of film splitting during the production of biaxially oriented film from said resin but not exceeding 7 weight percent, based upon the total weight of the polyester resin and the copolyesterether.

DETAILED DESCRIPTION OF THE INVENTION

The Applicant has discovered that the problem of film splitting during transverse orientation of polyester film can be significantly reduced, if not eliminated, by the addition of an effective amount of a specified copolyesterether. It is believed that the addition of less than 1.5 weight percent of the copolyesterether does not significantly reduce the frequency of film splitting, while greater than 7.weight percent creates other manufacturing problems, particularly with respect to quenching of the extruded polyester resin into amorphous cast sheet. Higher levels of the copolyesterether can also cause the polyester film to become opaque and milky, which is commercially undesirable.

The copolyesterethers which form a part of this invention are derived from a dicarboxylic acid component consisting essentially of 1,4-cyclohexanedicarboxylic acid or an ester-forming derivative thereof such as dimethyl-1,4-cyclohexanedicarboxylate. This acid and ester are both sometimes referred to herein as DMCD. The diol component consists essentially of 1,4-cyclohexanedimethanol (CHDM) and polytetramethylene ether glycol (PTMG). The copolyesterethers further comprise from about 0.1 to about 1.5 mole percent, based on the acid or glycol component, of a poly-functional branching agent having at least 3 carboxyl or hydroxyl groups.

The dibasic acid component of the copolyesterethers which form a part of this invention consists essentially of DMCD having a trans isomer content of at least 7%, preferably at least 80% and most preferably at least 85%.

The glycol component of this invention includes CHDM, which also preferably has a high trans isomer content, for example, at least 60%.

DMCD and CHDM are well known in the art and are commercially available. "Man-Made Fibers: Science and Technology," Vol. III, edited by Mark, Atlas and Cernia, published by Interscience Publishers describes preparation of DMCD and CHDM at page 85.

The polytetramethyleneether glycol component of this invention is also commercially available, and is prepared by well known techniques. The PTMG used in the copolyesterether of this invention has a molecular weight of between about 500 and about 1100, preferably about 1000. It is used in an amount of from about 15 to about 50 percent, preferably about 20-35%, based on the total Weight of the copolyesterether.

The copolyesterethers which form part of this invention further comprise from about 0.1 to about 1.5 mole percent, based on the acid or glycol component, of a polybasic acid or polyhydric alcohol branching agent having at least three COOH or OH functional groups and from 3 to 60 carbon atoms. The esters of many such acids or polyols may also be used. Suitable branching agents include trimellitic acid or anhydride, trimesic acid, trimethylol ethane, trimethylol propane, and trimer acid.

It should be understood that the total acid reactants should be 100 mole percent, and the total glycol reactants should be 100 mole percent. Although the acid reactant is said to "consist essentially of" DMCD, if the branching agent is a polybasic acid or anhydride, it will be calculated as part of the acidic reactant. Similarly, the glycol reactant is said to "consist essentially of" CHDM and PTMG. However, if the branching agent is a polyol, it will be calculated as part of the glycol reactant. Although for convenience the PTMG is specified in weight percent the total mole percentages of PTMG, CHDM and polyol if used, combine to make 100 mole percent glycol.

The copolyesterethers which form a part of this invention may include a phenolic antioxidant that is capable of reacting with the polymer intermediates. This causes the antioxidant to become chemically bonded to the copolyesterether and be essentially nonextractable from the polymer. Antioxidants useful in this invention should contain one or more of an acid, hydroxyl, or ester group capable of reacting with the reagents used to prepare the copolyesterether. It is preferred that the phenolic antioxidant be hindered and relatively nonvolatile. Examples of suitable antioxidants include hydroquinone, arylamine antioxidants such as 4,4'-bis ($\alpha,\alpha$-diphenylamine, hindered phenol antioxidants such as 2,6-di-tert-butyl-4-methylphenol, butylated p-phenylphenol and 2-($\alpha$-methylcyclohexyl)-4,6-dimethylphenol; bis-phenols such as 2,2'-methylenebis(6-tert-butyl-4-methylphenol), 4,4'-bis(2,6-di-tert-butylphenol), 4,4'-methylenebis-(6-tert-butyl-2-methylphenol), 4,4'-butylenebis-(6-tert-butyl-3-methylphenol), methylenebis-(2,6-di-tertbutylphenol), 4,4'-thiobis-(6-tert-butyl-2-methylphenol), and 2,2'-thiobis-(4-methyl-6-tert-butylphenol); tris-phenols such as 1,3,5-tris-(3,5-di-tert-butyl-4-hydroxyhydrocinnamoyl)-hexahydrotriazine, 1,3,5,-trimethyl-2,4,6-tris(3,5-di-tert-butyl-4-hydroxybenzyl)-benzene and tri(3,5-di-tert-butyl-4-hydroxyphenyl)-phosphite; and tetrakis[methylene(3,5-di-tert-butyl-4-hydroxyhydrocinnamate)methane) which is commercially available from Geigy Chemical Company as IRGANOX 1010 antioxidant, and is preferred. The antioxidant may be conveniently used in an amount of from about 0.1 to about 1.0 weight percent, based on the weight of the copolyesterether.

The copolyesterethers which form a part of this invention are further characterized by their good melt strength. A polymer having melt strength is described as one capable of supporting itself on being extruded downward from a die in the melt. When a hold together. When a polymer without melt strength is extruded downward, the melt rapidly drops and breaks. For purposes of comparison, the melt strength is measured at a temperature 20° C. above the melting peak.

Melting point or maximum peak during melting is determined on a differential scanning calorimeter Model DSC-2 from Perkin-Elmer Company at a heating rate of 2020 C. per minute.

Melt strength is measured by extruding molten polymer through a die 0.1 inch in diameter and 0.25 inch long with a Shear rate of 20 reciprocal seconds. The extrudate is allowed to fall freely from the die exit under gravity. The diameter of the extrudate supporting a six inch length of the extrudate is measured. If the extrudate is less than 0.1 inch in diameter, the die swell is then a negative number because there is no swell. If the extrudate is larger than .1 inch in diameter, the die swell is a positive number. The die swell is expressed as a percent. It is calculated as follows using a 0.1 inch diameter die:

$$\text{Die Swell, Percent} = \frac{\text{Diameter in inches of Extrudate at six inches} - 0.1 \text{ inch} \times 100}{0.1 \text{ inch}}$$

A die swell of % therefore indicates no change in the size of the extrudate.

The copolyesterethers which form a part of this invention have a die swell of from greater than $-90\%$ to about $+100\%$. Preferably, the die swell is greater than $-50\%$ and less than $+50\%$. The die swell of a copolyesterether can be increased by increasing the inherent viscosity or branching or both.

The trans and cis isomer contents of the final copolyesterether are controlled in order to obtain polymers that crystallize rapidly. Cis and trans isomer contents are measured by conventional methods well known to those skilled in the art. Copolyesterethers similar to those of this invention that have a low glass transition temperature and do not crystallize are sticky and tacky and cannot be used for forming useful objects. Copolyesterethers that crystallize slowly require long processing times. Therefore, to decrease processing time it is highly desirable to use rapidly crystallizing polyesterethers. The rates of crystallization of copolyesterethers can be measured by determining the times ($t_p$) to reach the peak crystallization exotherm during crystallization at various temperatures. Typically, there exists a temperature at which $t_p$ is less than any other temperature. This minimum value $t_p$ may be called $t_{min}$ and can be used as a single parameter characterization of crystallization rate. The shorter the minimum crystallization time ($t_{min}$), the faster the copolyesterether will crystallize. A $t_{min}$ time of less than about 2.5 minutes is desirable. A $t_{min}$ of about one minute or even 0.5 minute is even more preferred.

Further information on the preparation of copolyesteresters which form a part of the present invention may be found in U.S. Pat. No. 4,349,69, the disclosure of which is expressly incorporated by reference herein in its entirety.

The polyester resin employed in the present invention may be prepared by polycondensation of a dicarboxylic acid or a lower alkyl diester thereof with a glycol. Among the dicarboxylic acids and their lower alkyl diesters which may be employed to prepare the polyester resin are terephthalic; isophthalic; phthalic; 2,5-, 2,6-, and 2,7-naphthalene dicarboxylic; succinic; sebacic; adipic; azelaic; bibenzoic; the hexahydrophthalics; and bis-p-carboxy-phenoxyethane. One or more of these acids and/or their lower alkyl diesters is reacted with one or more glycols which include ethylene glycol; 1,3-propanediol; 1,4-butanediol; neopentyl glycol or 1,4-cyclohexanedimethanol. Since one or more diesters may be reacted with one or more glycols, the polyester resin of this invention is not limited to homopolyesters but also includes mixed polyesters such as copolyesters.

Of the film forming polyester resins within the contemplation of this invention, preferred are those containing at least a major amount of polyethylene terephthalate, the most preferred being polythylene terephthalate homopolymer having an intrinsic viscosity, as measured in orthochlorophenol at 25° C., greater than 0.3 deciliter per gram. More preferably, the intrinsic viscosity of the polymer ranges from about 0.4 to about 1.0 deciliter per gram, again measured in orthochlorophenol at 25° C. Still more preferably, the polyethylene terephthalate employed in the present invention has an intrinsic viscosity of about 0.5 to about 0.7 deciliter per gram measured in orthochlorophenol at 25° C.

The polyethylene terephthalate resin employed in this invention may be formed from a polymer produced by polymerization of bis(2-hydroxy ethyl) terephthalate. Bis(2-hydroxy ethyl) terephthalate is itself formed as an intermediate by one of two different methods. One method for producing bis(2-hydroxy ethyl) terephthalate is by direct esterification of terephthalic acid and ethylene glycol as described in U.S. Pat. No. 3,050,533. In this method the by-product of the reaction is water which is distilled from the reaction product. A second method for producing bis(2-hydroxy ethyl) terephthalate is by a transesterification reaction of a dialkyl ester of terephthalic acids, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification occurs more rapidly and completely. The transesterification reaction is conducted under conditions of elevated temperature. Preferably, the temperature is in the range of between about the boiling temperature of the reaction mixture to as high as 250° C. The reaction can occur at atmospheric, subatmospheric or superatmospheric pressure. The by-product of the transesterification reaction is an alkanol. For example, if dimethyl terephthalate is used, methanol is produced. The alkanol is removed from the reaction product. In order to increase the reaction rate, many known catalysts can be employed in the transsterification reaction.

After the bis(hydroxy ethyl) terephthalate has been produced, it is converted to polyethylene terephthalate polymer by heating to a temperature above the boiling point of ethylene glycol or the reaction mixture under conditions effecting the removal of the glycol or water. The heating may occur at a temperature as high as 325° C., if desired. In order to obtain the desired polymerized product it is essential that during the heating, or during a portion of the heating period, that the pressure be reduced so as to provide rapid distillation of the excess glycol or water. The pressure may be reduced in successive stages so that the heating begins at normal pressure. The pressure is thereafter reduced until a final reduced pressure is attained. Final pressures in the ran9e of from about 1 to 10 millimeters Hg are preferred. The materials used as catalysts in the estrification reaction may also be present as a catalyst in the polymerization reaction. The preferred polymerization catalysts are antimony compounds such as antimony trioxide, antimonic acid and the like. These polymerization catalysts accelerate conversion of the bis(2-hydroxy ethyl) terephthalate to polyethylene terephthalate polymer.

The heating of the polymerization reaction is conducted under conditions to prevent oxidation. To prevent the presence of oxygen a slow stream of an inert gas, for example nitrogen, carbon dioxide or the like, can be passed through or over the molten mass. During the heating and polymerization the viscosity of the melt gradually increases. Thus, the temperature must be maintained high enough to keep the mass in the molten state during the entire heating period. The heating is continued at least until a film can be formed from the melt which possesses the desired properties. Preferably, the melting point of the polymerized product exceeds about 240° C. Even more preferably, the melting point of the polymerized product is in excess of 25° C. After heating is completed the product may be utilized to produce films or otherwise removed from the reaction vessel in molten form and formed into blocks, chips and the like for further use.

The polyester resin may optionally include particles having an average particle size of from about 0.2 to 30 microns, preferably 0.2 to 8 microns. Such particles are commonly incorporated into polyester resins which are to be manufactured into biaxially-oriented polyester film in order to improve the abrasion resistance and to decrease the coefficient of friction of the finished film. For example, U.S. Pat. No. 3,669,931 teaches that the inclusion of hydrated aluminum silicate particles in polyester film improves its fatigue abrasion resistance. U.S. Pat. No. 3,821,156 discloses that resistance to both fatigue abrasion and frictional abrasion can be improved by incorporating dispersed particles of calcium carbonate and an inert additive, such as silica, talc, and hydrated alumina silicate, in polyethylene terephthalate film. Finally, U.S. Pat. No. 3,884,870 teaches that the coefficient of friction of biaxially-oriented polyethylene terephthalate film can be reduced without sacrificing its excellent clarity by the incorporation of inert particles having a bimodal particle size distribution. More specifically, this patent discloses a polyethylene terephthalate film having from 0.3 to 2.5 weight percent of a small particle size inert additive having an average particle size of 10 to 1,000 millimicrons in combination with from 0.002 to 0.018 weight percent of a large particle size inert additive having an average particle size of from 0.5 to 30 microns.

The disclosures of U.S. Pat. Nos. 3,669,391; 3,821,156; and 3,884,870 are each hereby expressly incorporated by reference herein in their entirety Both the polyester resin and the copolyesterether should be dried prior to extrusion. Polyester resin which is in chip or pellet form should be dried to a moisture level not greater than 0.01 and preferably less than 0.005 percent. The copolyesterether should be dried to a maximum moisture level of 0.05 percent, preferably not greater than 0.02 percent. Pellets of the copolyesterether can typically be dried to adequate levels by use of a dehumidifying hopper-type dryer in combination with dry air maintained at a temperature of 160 F. at a velocity of 1 cubic foot/minute/pound of pellets for three hours.

Dried pellets of the polyester resin and the copolyesterether can be mixed to9ether in an appropriate mixing device prior to extrusion. The mixed pellets are then fed to a conventional extruder which melts the pellets and blends the copolyesterether homogeneously throughout the polyester resin. The molten blend may then either be extruded in the form of a strand, quenched, cut into pellets, and stored for future use, or it may be immediately manufactured into film.

The extrusion, orientation, and crystallization steps involved in the manufacture of polyester film are well known to those of ordinary skill in the art. Dry polyester resin is typically melted and extruded through a slit die onto a polished, revolving casting drum to form a cast sheet of the polymer. Compressed air or electrostatic pinning may be used to force the molten extrudate against the polished surface of the casting drum. Electrostatic pinning is generally preferred due to the difficulties asssociated with compressed air, such as noise and oil contamination. Thereafter, the sheet is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and tranverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer soften and melts. In the case of polyethylene terephthalate film the stretching temperatures are typically in the range of from 80°-100° C.

The polyester film is heat treated under dimensional restraint, after stretching, for a period of time necessary to crystallize, or "heat set," the film. Crystallization imparts stability and good tensile properties the film. When polyethylene terephthalate is heat treated, it is typically subjected to a temperature in the range of between about 190° C. to 240° C. and, more preferably, in the range of from about 215° C. to 235° C.

The polyester resin of the present invention may also be used to manufacture co-extruded polyester films. The manufacture of such films is also well known, and differs primarily from the production of monolayer film by the use of specialized co-extrusion dies. Such dies are disclosed in U.S. Pat. Nos. 3,476,627; 3,833,704; and 4,443,397, the disclosures of which are each incorporated by reference herein. The use of such dies permits the manufacture of multilayer films such as two layer (A/B) and three layer (A/B/A) films.

EXAMPLES

The practice and advantages of the present invention are further disclosed in the following Examples, which are intended to be illustrative only and in no way limit the scope of the claimed invention.

EXAMPLE I

Pellets of a polyethylene terephthalate resin, having an intrinsic viscosity of approximately 0.62 deciliters/gram and which contains calcium carbonate particles and an inert additive (as is described in U.S. Pat. No. 3,821,156) were dried for six hours at a temperature of 160° C. in air possessing a dew point of −50° C. The dried pellets were then melted and extruded through an adjustable slot die into sheet-like form. The molten polyester is subsequently rapidly cooled ("quenched") by contact with a revolving casting drum having a highly polished chrome steel surface. The temperature of the casting drum was maintained at approximately 20° C. Effective quenching of the molten polyester was assured by electrostatically pinning the molten polyester to the surface of the casting drum.

The cast polyester sheet so produced was sequentially subjected to a longitudinal (machine direction) stretching and then transverse direction stretching to produce a biaxially-oriented film, which was then heat set at a temperature of about 225° C. for 3.5 seconds prior to being wound upon a mandrel to form a roll or cylinder of 48 gauge (12 micron) polyester film.

EXAMPLE II

Pellets of a copolyesterether commercially available under the accronym PCCE from Eastman Chemical Products Inc. were dried for six hours at a temperature of 130° C. in a forced air non-dessicated oven. This copolyesterether product is believed to comprise a copolymer of 100 mole percent of 1,4-cyclohexanedicarboxylic acid having a trans isomer content of at least 70 mole percent, 91 mole percent of 1,4-cyclohexanedimethanol and 9 mole percent of polytetramethyleneether glycol having an average molecular weight of 1000.

A metered quantity of dried copolyesterether pellets was continuously added to the dried polyethylene terephthalate pellets described in Example I above as the polyester pellets were being conveyed to the extruder. Using the general procedures of Example I, several biaxially-oriented polyester films were manufactured, with each film having a different percentage of copolyesterether blended into the polyester resin prior to extrusion.

The trial was started with the PCCE copolyesterether comprising 1% of the total melt rate. Once full concentration was realized at the die, sheet quality became very poor with thin clear areas and heavy white areas. Pulling the casting drum out from under the die resulted in an even opaque extrudate. Reducing the pinning voltage also yielded the same result, but reduced other aspect of the sheet quality beyond acceptability. It appeared that the PCCE at 10% concentration was too conductive and therefore not amenable to electrostatic pinning The PCCE concentration was then lowered to 1.25%. Samples were produced at this concentration and also 2.25% and 5.0%. Increasing the PCCE concentration to 7% resulted in poor sheet quality as before.

EXAMPLES III, IV, and V

Additional blended PET 48 gauge films were prepared on three occasions using procedures similar to those described in Example II. In each trial a 100% PET 48 gauge film sample was prepared as a control.

EXAMPLE VI

A two-layer coextruded polyester film was produced comprising a 2 micron thick layer of terepthalate/isophthalate copolyester resin ("PETIP") and a 10 micron thick layer of filled polyethylene terephthalate homopolymer resin, described in Example I above. The acid component of the PETIP copolyester comprised 18 mole percent isophthalic acid and 82 mole percent terephthalic acid.

The two resins were separately melted and extruded through a coextrusion die to produce an A/B extrudate which was immediately quenched upon a casting drum maintained at approximately 20° C. Effective quenching of the molten extrudate was achieved by electrostatically pinning the molten extrudate to the surface of the casting drum.

The cast coextruded polyester sheet so produced was sequentially subjected to a longitudinal (machine direction) stretching and then transverse direction stretching to produce a biaxially-oriented coextruded film, which was then heat set at a temperature of about 230° C. for 3.5 seconds prior to being wound upon a mandrel to form a roll or cylinder of coextruded polyester film.

Over the course of eight hours, the film split seven times, producing master rolls that ranged from 6,000 feet to 25,000 feet, with an average length of 13,000 feet. At this point, 2.5% PCCE was added to both the PETIP layer and the PET resin layer. After 2 hours of equilibration, the line ran for eight hours without a split.

The PCCE copolyesterether was then removed from the terephthalate/isophthalate stream and added only into the PET resin layer, still at 2.5%. The line ran for almost twenty hours producing a film with only one split. The cause of this split was unknown.

Film Splitting Summary

Table 1 reports the number of hours per splits for the various films. In the case of the first four sets of samples, these are averages. The fourth and fifth sets of examples ran for 96 and 108 hours, respectively, without any splits. Example VI(C), which is identical to example VI(A) but with the addition of 2.5% PCCE in the 10 micron thick PET layer, best illustrates the reduction of tenter splits. The film of Example VI(A) splits, on average, once every 1.1 hours, while the film of Example VI(C) averages one split every 20 hours.

The phenomenon of tenter splits is often attributable to a variety of processing conditions and material properties of the polyester. Some tenters seem to perform better than others and are more forgiving of process irregularities. Also, the thinner the final film product, the higher the split frequency. All the films illustrated in the examples were produced on the same tenter and in the same final thickness; 12 microns (48 gauge).

TABLE 1

| Sample | Film Composition | Avg. No. of hours between Splits |
|---|---|---|
| VI(A) | PETIP/PET Coextrusion (Control) | 1.1 hours |
| VI(C) | PETIP/PET with 2.5% PCCE (Coextrusion) | 20 hours |
| I, IV(A) | PET (Control) | 24 hours |
| III(D), III(E), IV(B), IV(C) | PET with 1.5-2.0% PCCE | 48 hours |
| VI(B) | PETIP with 2.5% PCCE/PET with 2.5% PCCE (Coextrusion) | 8 hours with no splits |
| III(B), III(C), II(B) | PET with 2.5-5.0% PCCE | >96 hours with no splits |
| V(B) | PET with 2.5% PCCE | >108 hours with no splits |

Evaluation of Flex Crack Resistance

Another advantage of the polyester resin of the present invention is that biaxially-oriented films manufactured from the resin exhibit greater resistance to flex cracking than films manufactured from unblended polyester resin. This resistance to flex cracking is especially important in packaging applications.

The flex crack resistance of several of the 48 gauge films produced in Examples I-VI was evaluated by flexing a 8×11 inch rectangular film sample for 1000 cycles on a Gelbo Flex Tester. The number of pinholes created in a central, approximately 7×10 inch area of the sample is reported. Red dye or ink can be applied to the flexed film sample and a white background placed against the opposite side of the sample to assist in identifying pinholes. Table 2 sets forth the relevant data:

TABLE 2

| Film Sample | Film Composition | No. Pinholes/ 1000 cycles |
|---|---|---|
| Example I | 100% PET (control) | 18.0 |
| Example II (A) | 2.25% PCCE | 8.4 |
| Example II (B) | 5.0% PCCE | 7.2 |
| Example III (A) | 100% PET (control) | 15.3 |
| Example III (B) | 2.5% PCCE | 6.5 |
| Example III (C) | 5.0% PCCE | 6.7 |
| Example III (D) | 1.5% PCCE | 10.7 |
| Example III (E) | 2.0 PCCE | 9.3 |
| Example IV (A) | 100% PET (control) | 18.0 |
| Example IV (B) | 1.75% PCCE | 9.8 |
| Example IV (C) | 2.0% PCCE | 8.5 |
| Example V (A) | 100% PET (control) | 14.0 |
| Example V (B) | 2.5% PCCE | 3.8 |
| Example VI (A/B Coextruded films) | | |
| (A) | PETIP/PET (control) | 32 |
| (B) | PETIP with 2.5% PCCE/PET with 2.5% PCCE | |
| (C) | PETIP/PET with | 18 |

TABLE 2-continued 2.5% PCCE

Example I was run immediately prior to Example II, and used the same PET polymer batch. Examples III - VI each made use of different PET polymer batches. The variation in pin hole count for the various control batches is attributable to initial differences in molecular weight and/or final molecular weight as affected by completeness of polymer drying.

I claim:

1. A polyester resin containing a copolyesterether comprising:
    (A) a dicarboxylic acid component consisting essentially of 1,4-cyclohexanedicarboxylic acid having a trans isomer content of at least 70%,
    (B) a glycol component consisting essentially of
        (1) 1,4-cyclohexanedimethanol, and
        (2) from about 15 to about 5 weight percent, based on the weight of the polyesterether, of polytetramethyleneether glycol having a molecular weight of about 500 to about 1100 and
    (C) from about 0.1 to about 1.5 mole percent, based on the mole percentage of the acid or glycol component, of a branching agent having at least three carboxyl or hydroxyl functional groups and from 3 to 60 carbon atoms,
said copolyesterether being present in said polyester resin in an amount effective to reduce the occurrence of film splitting during the production of biaxially oriented film from said resin but not exceeding 7 weight percent, based upon the total weight of the polyester resin and the copolyesterether.

2. The resin of claim 1 wherein the 1,4-cyclohexanedicarboxylic acid has a trans isomer content of at least 80% and the 1,4-cyclohexanedimethanol has a trans isomer content of at least 60%.

3. The resin of claim 1 wherein the 1,4-cyclohexanedicarboxylic acid has a trans isomer content of at least 85% and the 1,4-cyclohexanedimethanol has a trans isomer content of at least 60%.

4. The resin of claim 1 wherein the molecular weight of the polytetramethylene ether glycol is from about 500 to 1000.

5. The resin of claim 1 wherein the polytetramethylene ether glycol is present in an amount of from about 20 to 35% based on the total weight of the copolyesterether.

6. The resin of claim 1 wherein the branching agent is trimellitic anhydride.

7. The resin of claim 1 further comprising an antioxidant ranging from 0.1 to 1.0 percent by weight, based upon the weight of the copolyesterether.

8. The resin of claim 1 wherein the die swell of said copolyesterether is between about −50% and +50%.

9. The resin of claim 1 wherein the minimum crystallization time of said copolyesterether is less than one minute.

10. The resin of claim 1 wherein the minimum crystallization time of said copolyesterether is less than one-half minute.

11. The resin of claim 1 having from 2.50 to 5.0 weight percent of said copolyesterether.

12. A polyester resin having from 2.5 to 5.0 weight percent, based upon the total weight of the resin, of a copolyesterether comprising
    (A) a dicarboxylic acid component consisting essentially of 1,4-cyclohexanedicarboxylic acid having a trans isomer content of at least 80%,
    (B) a glycol component consisting essentially of
        (1) 1,4-cyclohexanedimethanol having a trans isomer content of at least 60%, and
        (2) from about 20 to about 35 weight percent, based on the weight of the polyesterether, of polytetramethyleneether glycol having a molecular weight of about 500 to about 1000 and
    (C) from about 0.1 to about 1.5 mole %, based on the mole % of the acid or glycol component, of a branching agent having at least three carboxyl or hydroxyl functional groups and from 3 to 60 carbon atoms.

13. The resin of claim 12 further comprising from 0.01 to 3.0 weight percent based upon the total weight of the resin, of inert particles selected from the group of silica, barium sulfate, hydrated alumina, and calcium carbonate.

14. The resin of claim 13 wherein said particles have an average particle size in the range of from 0.2 to 30 microns.

15. The resin of claim 13 wherein said particles possess a bimodal particle size distribution.

16. The resin of claim 15 having from about 0.3 to about 2.5 percent by weight of a small particle size inert additive having an average particle size of from 10 to 1,000 millimicrons and a large particle size inert additive having an average particle size of from 0.5 to 30 microns, said large particle size inert additive being present in a concentration ranging from 0.002 to 0.015 percent by weight of said resin.

17. A biaxially-oriented polyester film prepared from the resin of claim 1.

18. A biaxially-oriented polyester film prepared from the resin of claim 12.

19. A coextruded polyester film in which at least one layer comprises the polyester film of claim 12.

* * * * *